UNITED STATES PATENT OFFICE.

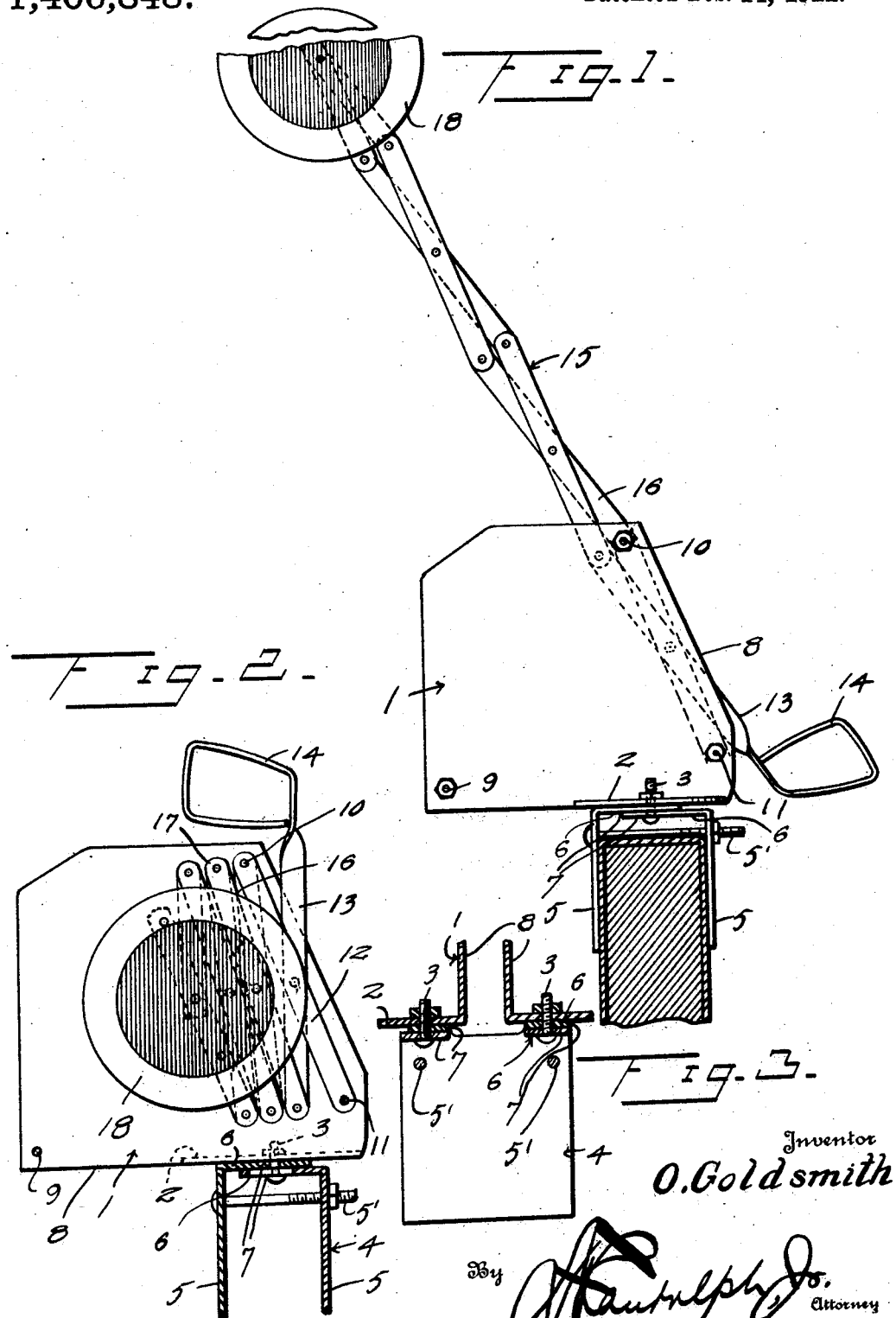

ORVIE GOLDSMITH, OF MILLERTON, NEW YORK.

CAUTION DEVICE FOR AUTOMOBILES.

1,406,848.   Specification of Letters Patent.   Patented Feb. 14, 1922.

Application filed July 22, 1921. Serial No. 486,697.

*To all whom it may concern:*

Be it known that I, ORVIE GOLDSMITH, a citizen of the United States, residing at Millerton, in the county of Dutchess and State of New York, have invented certain new and useful Improvements in Caution Devices for Automobiles; and I do hereby declare the following to be a full, clear, and exact description of the invention, such as will enable others skilled in the art to which it appertains to make and use the same.

This invention relates to new and useful improvements in caution or warning signals for automobiles and has for its primary object the provision of a device which may be easily and quickly actuated by the driver of an automobile to warn traffic of a turn from a straight course or of a stop and adapted to obviate the practice of the driver extending an arm to give a signal and also the device is adapted to remain in either of its signaling or non-signaling positions unattended, consequently leaving the driver or operator free to control the automobile.

Another object of this invention is the provision of a warning or cautioning signal of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a signal constructed in accordance with my invention and showing the indicator in a signaling position, Figure 2 is a vertical sectional view illustrating the device with the indicator in a non-signaling position, Figure 3 is a detail view illustrating the means of attaching the device to an automobile.

Referring in detail to the drawings, the numeral 1 indicates a casing or housing which has formed upon its lower edges oppositely extending attaching ears 2 which are arranged at right angles to the walls of the casing or housing and have attached thereto by means of bolts 3 a clamp 4 adapted to be positioned over and secured to any desired part of an automobile such as the door or side of the body. The clamp 4 includes a pair of plates 5 which have their upper ends bent at right angles to form attaching portions 6 that are cut away to provide pairs of arms 7 adapted to have overlapping relation with each other. One pair of arms is provided with openings to receive the bolts 3 while the other pair of arms are slotted to receive said bolts thereby providing a construction wherein the plates 5 of the clamp 4 may be adjusted towards and from each other to permit the device to be applied to automobiles wherein the doors thereof vary in thickness. The clamp 4 also establishes a connection between the side walls or plates 8 which constitutes the casing or housing 1. The plates 8 are relatively spaced and are attached by bolts 9, 10, and 11. The bolt 9 is arranged at one corner of the casing while the bolts 10 and 11 are arranged at opposite corners of the casing. The bolts 10 and 11 are connected by a supporting rod 12 and has pivoted thereto a lever 13, the outer end of which is bent to form a handle or finger grip 14 so that a person may readily rock the lever on its pivot. A lazy-tongs 15 has one of its elements 16 pivoted to the bolt 10 while its element 17 is pivoted to the inner end of the lever. The lazy-tongs 15 at its other end carries a signal or indicator 18 in the form of a circular disk which is painted or otherwise coated to attract attention thereto. The indicator is preferably painted with a yellow border with a red center. The normal position of the indicator is confined wholly within the casing or between the walls 8 thereof and by pulling on the handle 14, the lever 13 causes the lazy-tongs 15 to extend the indicator outwardly of the casing and laterally of the automobiles so as to be in clear view of traffic, thereby warning the traffic that the operator of a respective automobile intends to make a turn from a straight course or to make a stop.

The clamp 4 or the plates 5 thereof are provided with the bolts 5' which are adapted to draw said plates into tight engagement with the walls or door of the body of the automobile.

While I have shown and described the preferred embodiment of my invention, it will be understood that minor changes in construction, combination and arrangement of parts may be made without departing from the spirit and scope of the invention as claimed.

Having thus described my invention what I claim is.

1. A caution signal comprising a casing, oppositely extending ears formed on said casing, relatively spaced plates having their upper ends bent to form attaching portions engaging said ears and bifurcated to provide pairs of arms arranged in overlapping relation, one pair of said arms having openings and the other pair of arms having slots, bolts extending through the openings of the ears and one pair of arms and the slots of the other pair of arms to adjustably connect the plates to the sides of an automobile and to the ears, and an indicator carried by said casing.

2. A signal comprising a casing including relatively spaced plates, means connecting said plates to an automobile, bolts connecting the plates together, a supporting rod carried by a pair of said bolts, a lever pivoted to said rod and having one end bent to form a handle, a lazy-tongs pivoted to one of the bolts and to the inner end of the lever, and an indicating disk carried by the other end of the lazy-tongs.

In testimony whereof I affix my signature in presence of two witnesses.

ORVIE GOLDSMITH.

Witnesses:
CHARLES A. STEPHENS,
HELEN E. STEPHENS.